(12) United States Patent
Minowa

(10) Patent No.: US 12,019,207 B2
(45) Date of Patent: Jun. 25, 2024

(54) WATER VAPOR OBSERVATION INSTRUMENT AND WATER VAPOR OBSERVATION METHOD

(71) Applicant: Furuno Electric Co., Ltd., Nishinomiya (JP)

(72) Inventor: Masahiro Minowa, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 540 days.

(21) Appl. No.: 17/369,458

(22) Filed: Jul. 7, 2021

(65) Prior Publication Data

US 2021/0333435 A1    Oct. 28, 2021

Related U.S. Application Data

(63) Continuation of application No. PCT/JP2020/000132, filed on Jan. 7, 2020.

(30) Foreign Application Priority Data

Feb. 12, 2019  (JP) .................................. 2019-022287

(51) Int. Cl.
*G01W 1/00*   (2006.01)
*G01N 22/00*   (2006.01)

(52) U.S. Cl.
CPC ............ *G01W 1/00* (2013.01); *G01N 22/00* (2013.01)

(58) Field of Classification Search
None
See application file for complete search history.

(56) References Cited

U.S. PATENT DOCUMENTS

| 4,873,481 A | 10/1989 | Nelson et al. |
| 5,526,676 A | 6/1996 | Solheim et al. |
| 5,777,481 A * | 7/1998 | Vivekanandan ....... G01N 22/04 324/640 |
| 6,489,915 B1 | 12/2002 | Lines et al. |

(Continued)

FOREIGN PATENT DOCUMENTS

| CA | 1285990 | * | 7/1991 |
| CA | 1285990 C |   | 7/1991 |

(Continued)

OTHER PUBLICATIONS

ISA Japan Patent Office, International Search Report Issued in Application No. PCT/JP2020/000132, Mar. 24, 2020, WIPO, 5 pages.

(Continued)

*Primary Examiner* — Hoon K Song
(74) *Attorney, Agent, or Firm* — Alleman Hall & Tuttle LLP

(57) ABSTRACT

A microwave radiometer includes an electromagnetic wave transmission surface, a vertically upward horn configured to receive an electromagnetic wave passing through the electromagnetic wave transmission surface and processing circuitry configured to generate water vapor spectrum data relating to water vapor based on the electromagnetic wave received by the horn, generate cloud liquid water data relating to cloud liquid water based on the electromagnetic wave received by the horn, and calculate a water vapor amount by using the water vapor spectrum data and the cloud liquid water data.

20 Claims, 8 Drawing Sheets

(56) References Cited

U.S. PATENT DOCUMENTS

| | | | |
|---|---|---|---|
| 2005/0184740 A1* | 8/2005 | Ware | G01D 11/24 |
| | | | 73/29.01 |
| 2006/0164063 A1 | 7/2006 | Solheim et al. | |
| 2016/0252614 A1 | 9/2016 | Takechi et al. | |
| 2018/0113211 A1 | 4/2018 | Park et al. | |
| 2018/0142477 A1* | 5/2018 | Park | G01S 13/04 |
| 2018/0209920 A1 | 7/2018 | Minowa | |

FOREIGN PATENT DOCUMENTS

| | | |
|---|---|---|
| CN | 102253059 A | 11/2011 |
| CN | 102455304 A | 5/2012 |
| CN | 102636500 A | 8/2012 |
| CN | 105474041 A | 4/2016 |
| CN | 106053490 A | 10/2016 |
| JP | 5062083 A | 5/1975 |
| JP | S6176943 A | 4/1986 |
| JP | 2010060444 A | 3/2010 |
| JP | 2010164383 A | 7/2010 |
| JP | 2013224884 A | 10/2013 |
| WO | 2016035496 A1 | 3/2016 |

OTHER PUBLICATIONS

Ishimoto, H. et al., "Temperature and Water Vapor in Clouds by Terrestrial Multi-Wavelength Micro-Wave Radiometer," Meteorological Research Institute, Symposium Proceedings, Oct. 31, 2009, vol. 96, 3 pages.

Shoji, Y., "Development and Future of Water Vapor Observation Technology," Tenki, vol. 54, No. 10, Oct. 2007, 8 pages.

European Patent Office, Extended European Search Report Issued in Application No. 20755519.4, Sep. 9, 2022, Germany, 8 pages.

* cited by examiner

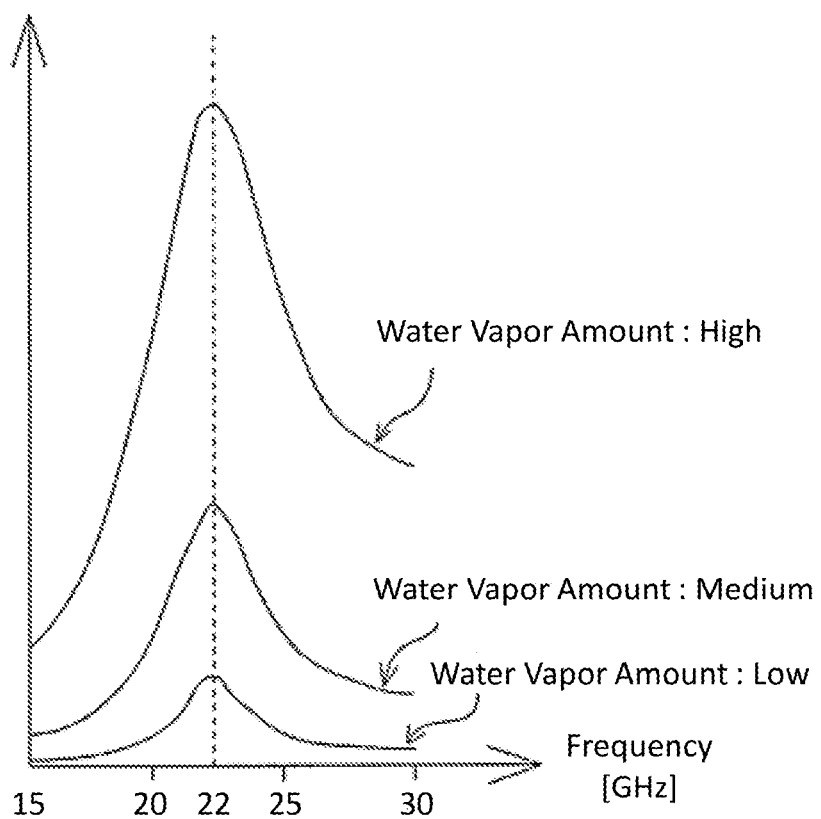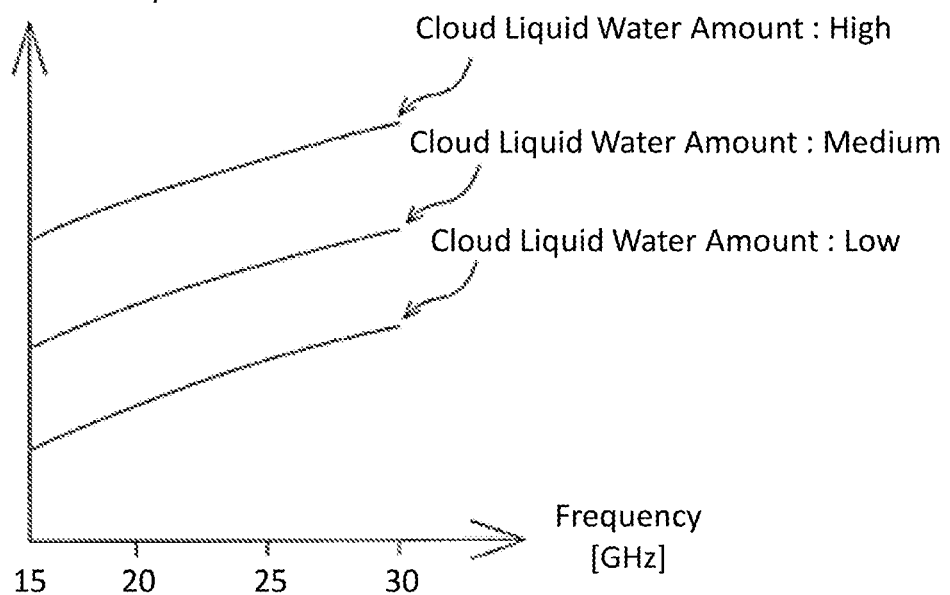
FIG. 2

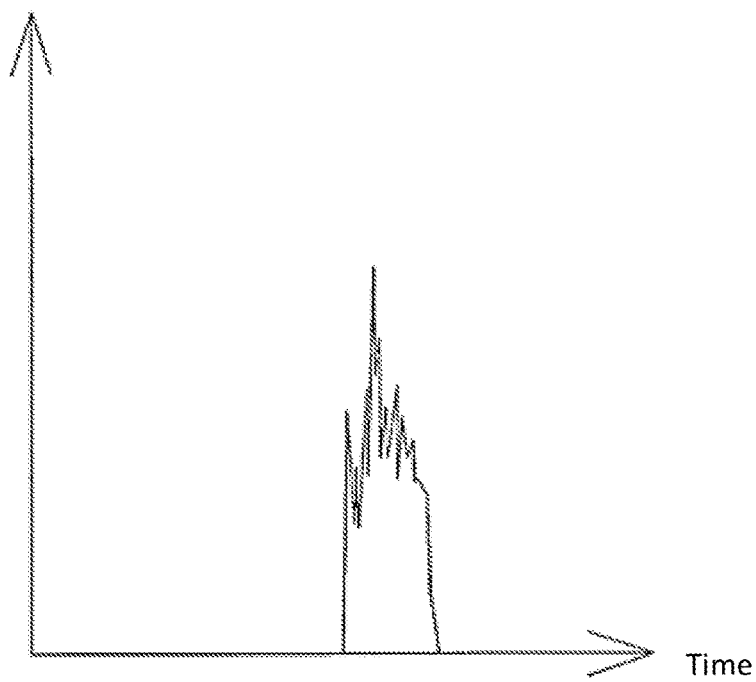
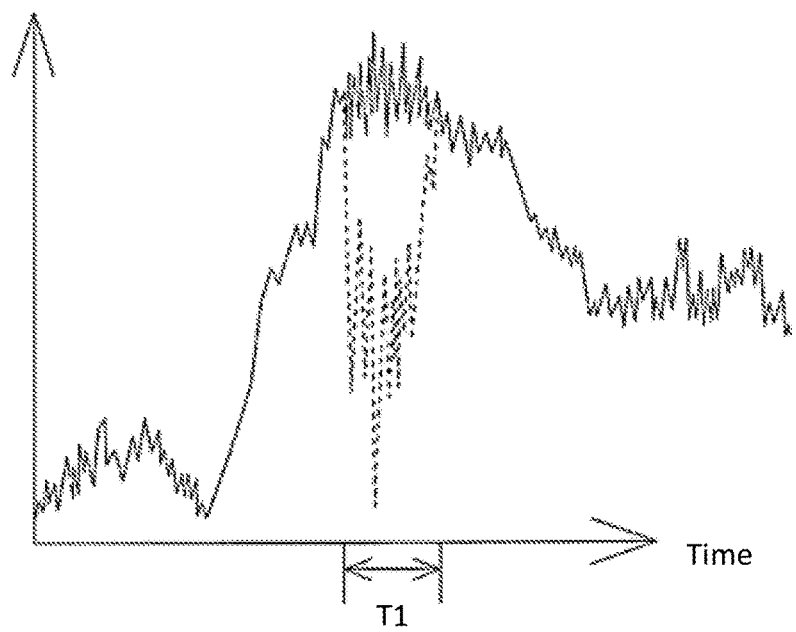
FIG. 5

WATER VAPOR OBSERVATION INSTRUMENT AND WATER VAPOR OBSERVATION METHOD

CROSS-REFERENCE TO RELATED APPLICATION(S)

This application is a continuation of PCT International Application No. PCT/JP2020/000132, which was filed on Jan. 7, 2020, and which claims priority to Japanese Patent Application Ser. No. 2019-022287 filed on Feb. 12, 2019, the entire disclosures of each of which are herein incorporated by reference for all purposes.

TECHNICAL FIELD

The present disclosure relates to a water vapor observation instrument (hereinafter "microwave radiometer") and a water vapor observation method.

BACKGROUND

For the purpose of water vapor observation, satellites, a GNSS receiver, a microwave radiometer, a water vapor LiDAR, etc. are known.

When water vapor is observed by a microwave radiometer using the emission of electromagnetic waves from water vapor in the atmosphere, as a first problem, it is necessary to consider a method of receiving electromagnetic waves to facilitate processing.

As a second problem, an electromagnetic wave to be received includes both an electromagnetic wave radiated from water vapor and an electromagnetic wave radiated from cloud liquid water, and it is considered that the electromagnetic wave radiated from the water vapor may be affected by the cloud liquid water.

SUMMARY

An object of the present disclosure is to provide a microwave radiometer and a water vapor observation method capable of accurately and easily observing an amount of water vapor in consideration of an influence of cloud liquid water in the atmosphere.

A microwave radiometer of the present disclosure includes: an electromagnetic wave transmission surface; a vertically upward horn configured to receive an electromagnetic wave passing through the electromagnetic wave transmission surface; and processing circuitry configured to: generate water vapor spectrum data relating to water vapor based on the electromagnetic wave received by the horn; generate cloud liquid water data relating to cloud liquid water based on the electromagnetic wave received by the horn; and calculate a water vapor amount by using the water vapor spectrum data and the cloud liquid water data.

The processing circuitry is further configured to determine that one of: rain and snow is falling when an cloud liquid water amount indicated by the cloud liquid water data is equal to or greater than a predetermined threshold value, and calculate a correction value corresponding to the cloud liquid water data and add the correction value to the water vapor amount.

The microwave radiometer is further comprised to the cleaner configured to removes the water or snow when the processing circuitry detects whether rain or snow is falling at a location where the horn is located.

Thus, since the horn facing upwards in the vertical direction is configured to be capable of receiving electromagnetic waves, the total amount of water vapor present above the horn can be measured, and the water vapor amount can be easily measured, for example, as compared with the case when electromagnetic waves are received in a direction other than the vertically downwards direction with the horn facing sideways. Further, since the water vapor amount is calculated using the cloud liquid water data affecting the water vapor amount, the accuracy of calculating the water vapor amount can be improved. Therefore, it is possible to provide a microwave radiometer and a water vapor observation method capable of accurately and easily observing the water vapor amount in consideration of the influence of cloud liquid water in the atmosphere.

BRIEF DESCRIPTION OF THE DRAWINGS

The present disclosure is illustrated by way of example and not by way of limitation in the figures of the accompanying drawings, in which like reference numerals indicate like elements and in which:

FIG. 2 shows a spectrum of water vapor and a spectrum of cloud liquid water;

FIG. 5 shows a correction value based on cloud liquid water data and a water vapor amount after adding the correction value multiplied by a factor to the water vapor amount (after correction);

DETAILED DESCRIPTION

One embodiment of the present disclosure will now be described with reference to the drawings.

Figure 1:
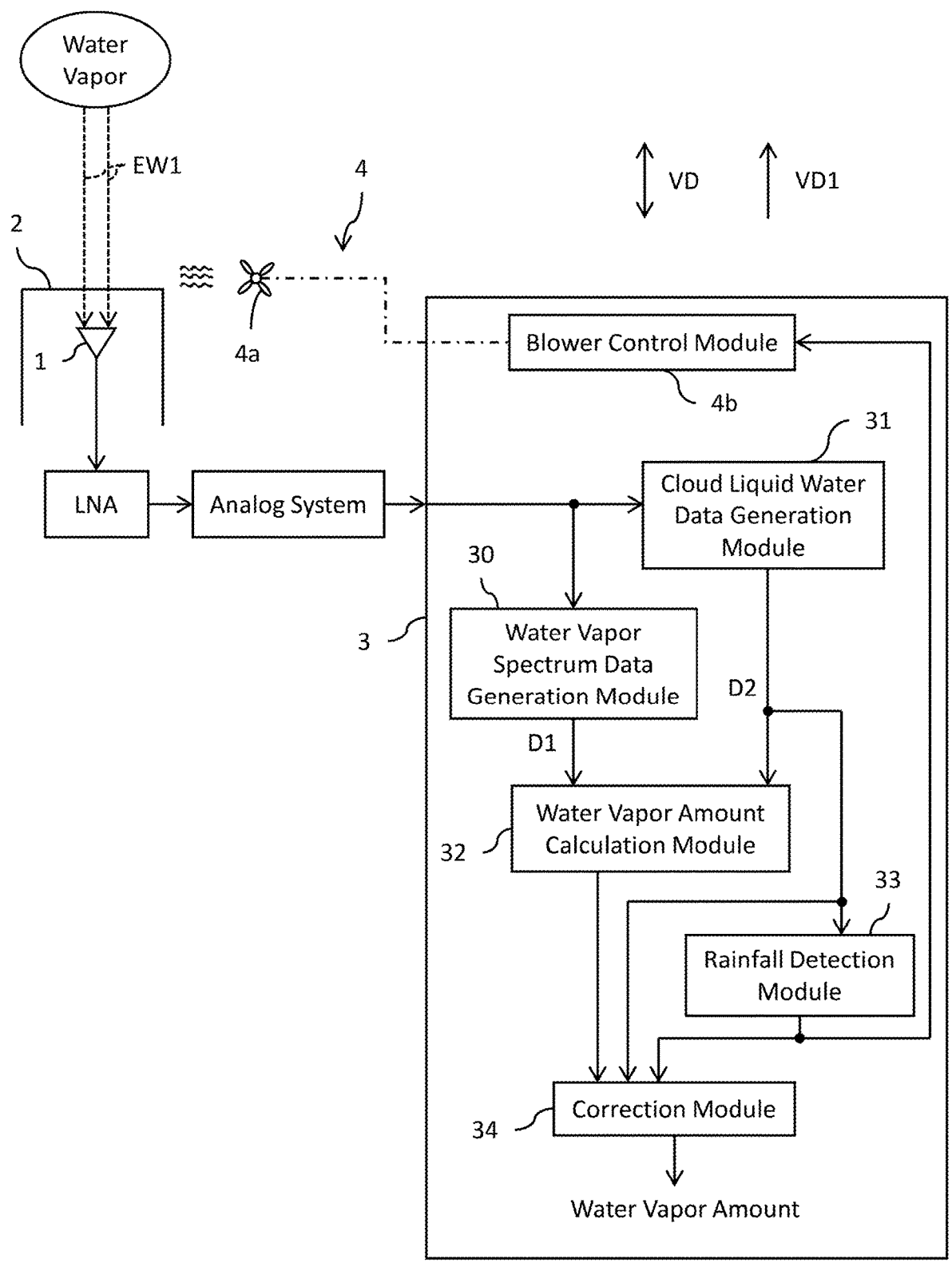
FIG. 1 shows a configuration of a microwave radiometer according to an embodiment.

FIG. 1 is a diagram showing a configuration of a microwave radiometer according to an embodiment.

As shown in FIG. 1, the microwave radiometer has a horn (horn antenna) 1 vertically upward and an electromagnetic wave transmission surface (electromagnetic wave input surface, radome) 2 surrounding the horn 1. The horn 1 faces upward VD1 along a vertical direction VD. As shown in the figure, an electromagnetic wave EW1 emitted from water vapor existing in the atmosphere passes through the electromagnetic wave transmission surface 2 and is received by the horn 1. The electromagnetic wave EW1 reaching the horn 1 is input to a signal processor module 3 via an LNA (low noise amplifier) and an analog system.

The signal processor module 3 has a water vapor spectrum data generation module 30, a cloud liquid water data generation module 31, and a water vapor amount calculation module (vapor quantity calculation module) 32. The water vapor spectrum data generation module 30 specifies water vapor spectrum data D1 relating to water vapor based on the electromagnetic waves received by the horn 1. The cloud liquid water data generation module 31 specifies cloud liquid water data D2 related to cloud liquid water based on the electromagnetic waves received by the horn 1. The water vapor amount calculation module 32 calculates a water vapor amount by using the water vapor spectrum data D1 and the cloud liquid water data D2. Hereinafter, the description will be made in detail.

FIG. 2 shows a spectrum of water vapor and a spectrum of cloud liquid water. As shown in FIG. 2, the spectrum of water vapor has a peak at 22 GHz, and a radio wave intensity at 22 GHz changes according to an amount of water vapor. The water vapor spectrum data generation module 30 generates the water vapor spectrum data D1 relating to water vapor by using radio wave intensity of a frequency around 22 GHz or 22 GHz.

As shown in FIG. 2, the spectrum of cloud liquid water shows an inclined shape such that a radio wave intensity increases from a low frequency side to a high frequency side, and a gradient angle and the radio wave intensity change according to an amount of cloud liquid water. The cloud liquid water data generation module 31 generates the cloud liquid water data D2 based on at least one frequency other than 22 GHz.

Figure 3:
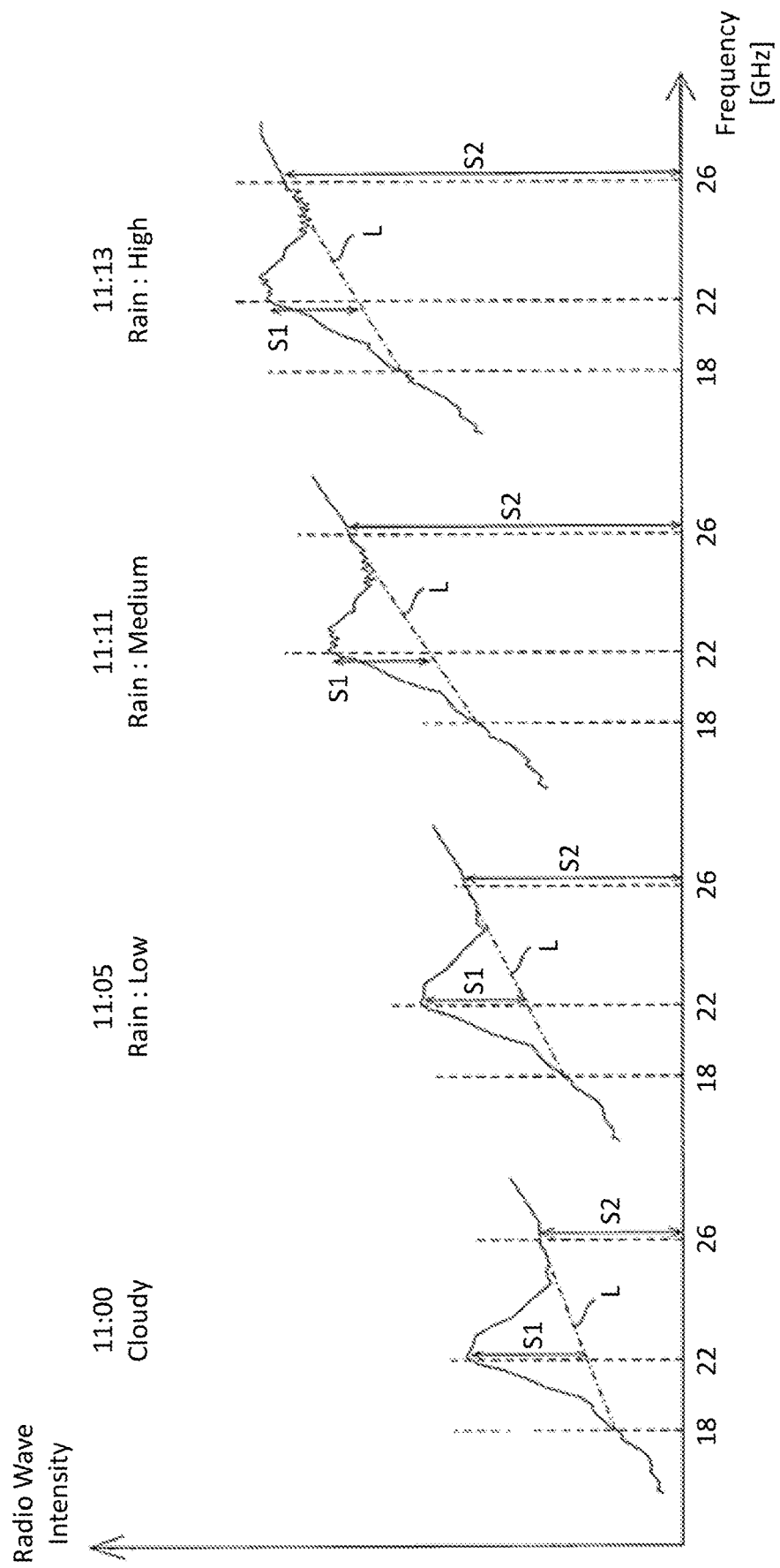
FIG. 3 shows a spectrum of a frequency and intensity of electromagnetic waves received at time instances 11:00, 11:05, 11:11 and 11:13.

FIG. 3 shows a spectrum of a frequency and intensity of the received electromagnetic wave at time instances 11:00, 11:05, 11:11, and 11:13. It was cloudy with no rain at 11:00, light rain at 11:05, and the amount of rain increased from 11:11 to 11:13. As shown in FIG. 3, when the amount of cloud liquid water increases, the electric wave intensity becomes large as a whole, so that it is difficult to calculate the amount of water vapor even if only the water vapor spectrum data D1 of 22 GHz is taken into consideration. Therefore, it is necessary to specify cloud liquid water data D2 as a standard for calculating the water vapor amount.

As shown in FIG. 3, the amount of cloud liquid water can be expressed, for example, by a radio wave intensity of 17, 18 or 26 GHz other than 22 GHz or a combination thereof. In FIG. 3, the radio wave intensity of 26 GHz is defined as a cloud liquid water amount S2, but the present invention is not limited thereto. For example, the radio wave intensity of 17 or 18 GHz may be set as the amount of cloud liquid water. As shown in FIG. 3, it can be seen that the cloud liquid water amount S2 increases as the rain becomes stronger. It is considered that the radiation of the electromagnetic wave from the raindrop increases in the rainy weather. It can be seen that a water vapor amount S1 decreases with the amount of rainfall (amount of cloud liquid water). It is considered that the water vapor amount S1 decreases because electromagnetic waves generated from water vapor are blocked by raindrops and cannot reach the horn 1.

The cloud liquid water data generation module 31 can generate the cloud liquid water data D2 based on the radio wave intensity of one frequency other than 22 GHz, but preferably generates the cloud liquid water data D2 based on the radio wave intensity of at least two frequencies other than 22 GHz. For example, as shown in FIG. 3, a virtual line L indicating a gradient of cloud liquid water in the spectrum of frequency-radio wave intensity can be specified based on the radio wave intensity at one point (1 point near 17 GHz or 18 GHz) on the lower frequency side than 22 GHz and the radio wave intensity at one point (1 point near 26 GHz) on the higher frequency side than 22 GHz. The imaginary line L serves as a standard for calculating the water vapor amount. In the present embodiment, the virtual line L is a straight line, but the virtual line L is not limited thereto, and may be an approximate straight line or curve based on radio wave intensity of three or more frequencies.

The water vapor amount calculation module 32 calculates the water vapor amount S1 by using the water vapor spectrum data D1 and the cloud liquid water data D2. In the present embodiment, the water vapor amount calculation module 32 calculates the water vapor amount S1 based on a predetermined frequency other than at least two frequencies (22 GHz or its neighboring frequency) and the virtual line L. More specifically, although a value obtained by subtracting the radio wave intensity of 22 GHz on the virtual line L from the radio wave intensity of 22 GHz is defined as the water vapor amount S1, the present invention is not limited thereto. The water vapor amount calculation module 32 may always calculate the water vapor amount S1, may calculate the water vapor amount S1 at every predetermined time, or may calculate the water vapor amount S1 at a predetermined time.

Figure 4:
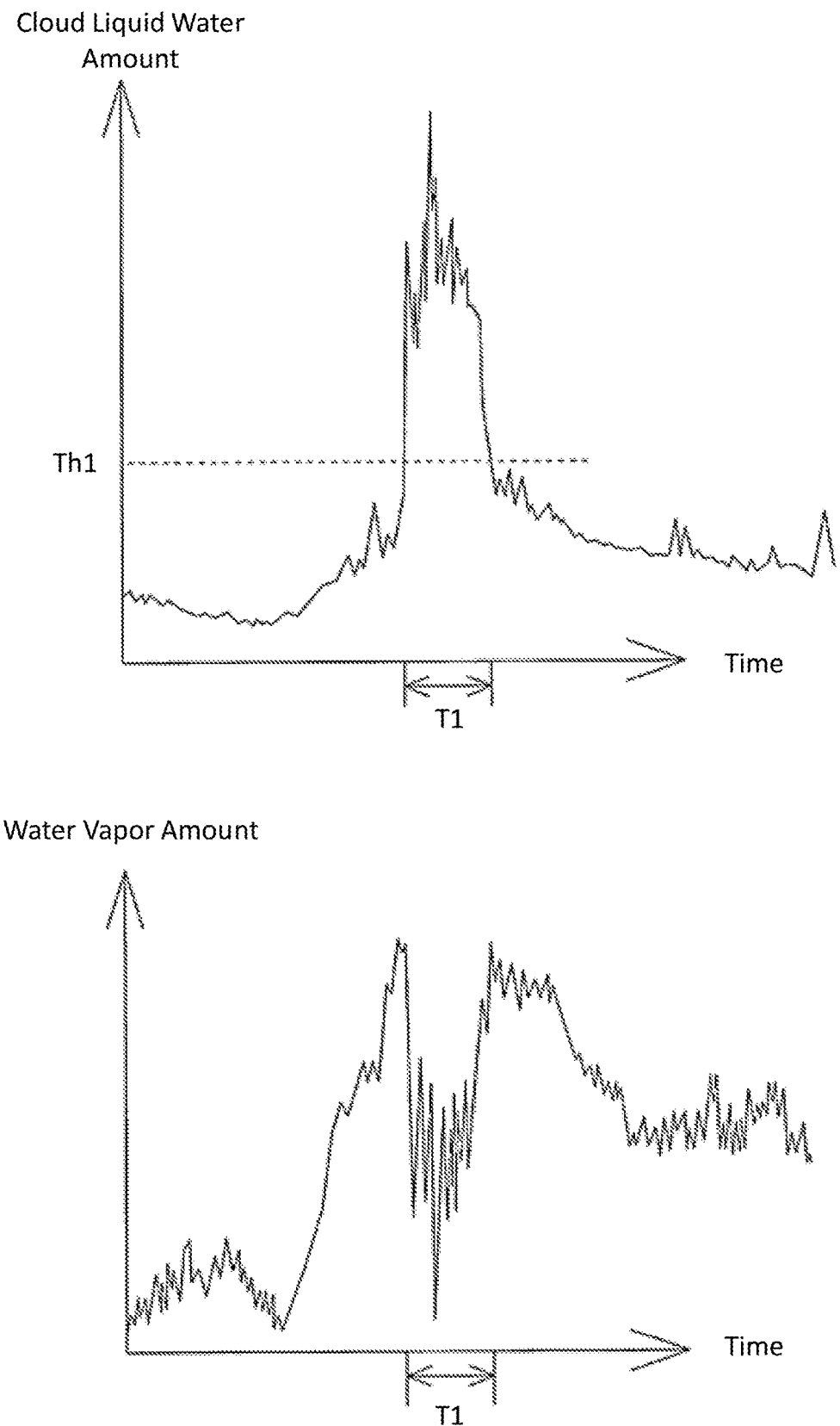
FIG. 4 shows the changes in water vapor and cloud liquid water over time.

FIG. 4 is a graph showing the changes in the water vapor amount S1 and the cloud liquid water amount S2 over time. In the figure, rain falls in a period T1 indicated by an arrow, and no rain is observed in other periods. In the figure, the amount of water vapor rapidly decreases during the rainfall period T1.

Therefore, in the present embodiment, as shown in FIG. 1, a rainfall detection module (rain sensor) 33 and a correction module 34 are provided. The rainfall detection module 33 detects rainfall or snowfall (whether rain or snow is falling) at a position where the horn 1 is located. More specifically, as shown in FIG. 4, the rainfall detection module 33 determines whether rain or snow is falling based on the cloud liquid water data D2. In the example of FIG. 4, if the amount of cloud liquid water is equal to or greater than the predetermined threshold Th1, it is determined that rain or snow has occurred, and if the amount of cloud liquid water is less than the predetermined threshold Th1, it is determined that rain or snow has not occurred. The rainfall detection module 33 may be configured to detect rain or snow at the position where the horn 1 is located by receiving a signal indicating whether rain or snow is falling from the outside.

When rainfall or snowfall is detected by the rainfall detection module 33 (i.e., when the rainfall detection module 33 detects that rain or snow is falling), the correction module 34 calculates a correction value according to cloud liquid water data D2, adds the correction value to the water vapor amount S1 calculated by the water vapor amount calculation module 32, and corrects the water vapor amount S1. When rainfall or snowfall is not detected by the rainfall detection module 33 (i.e., when the rainfall detection module 33 does not detect that rain or snow is falling), the correction module 34 does not perform the correction of the water vapor amount S1 calculated by the water vapor amount calculation module 32. FIG. 5 shows a correction value based on the cloud liquid water data D2 and a water vapor amount after adding the correction value multiplied by a factor to the water vapor amount (after correction). In the graph of the water vapor amount in FIG. 5, a dotted line portion in the period T1 indicates the water vapor amount before correction, and a solid line in the period T1 indicates the water vapor amount after correction.

As shown in FIG. 1, the microwave radiometer has a removal module (cleaner) 4 for removing water or snow adhered to the horn 1 or the electromagnetic wave transmission surface 2. The removal module 4 shown in FIG. 1 has a wind force generation module (blower) 4a such as a fan or a blower for generating wind force, and a blower control module 4b for controlling the wind force generation module 4a, and removes water or snow by the wind force. The removal module 4 is configured to remove water or snow when the rainfall detection module 33 detects that rain or snow is falling. Of course, regardless of the detection (existence) of rainfall or snowfall, the removal module 4 may be configured to continuously operate constantly, periodically, or randomly. The removal module 4 may be omitted if necessary.

<Modified Example of the Removal Module>

Figure 6:
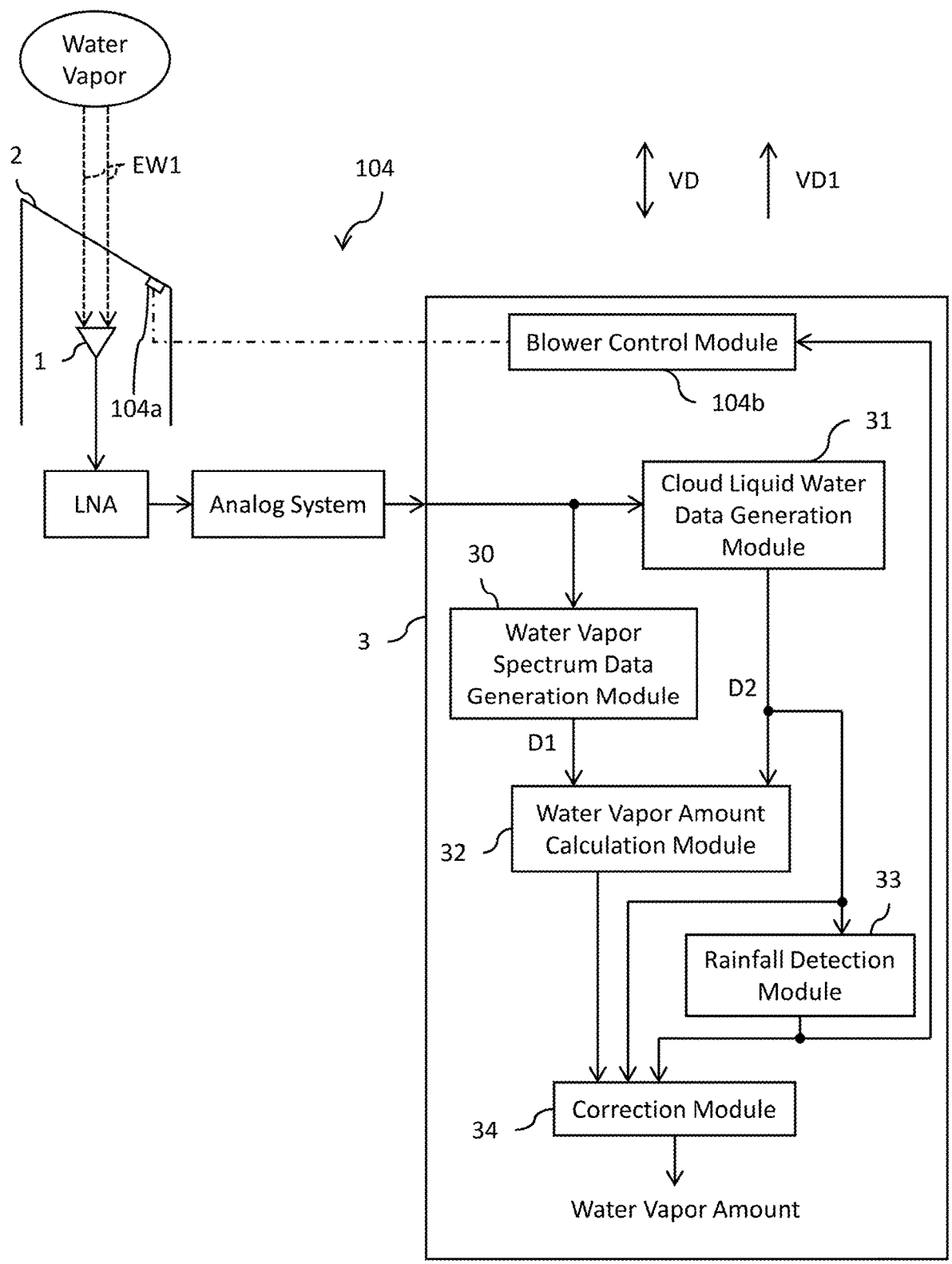
FIG. 6 shows the configuration of a microwave radiometer according to another embodiment.

As shown in FIG. 6, a removal module 104 can be changed. The removal module 104 has a vibration generation module 104a for generating vibration and a blower control module 104b for controlling the vibration generation module 104a, and is configured to remove water or snow by vibration. The removal module 104 is configured to remove water or snow when the rainfall detection module 33 detects that rain or snow is falling. It is preferable that an upper surface of the electromagnetic wave transmission surface 2 is inclined with respect to the vertical direction VD instead of the horizontal direction. This is because water or snow is easily dropped by the removal modules 4 and 104.

<Modification of the Rainfall Detection Module>

Figure 7:
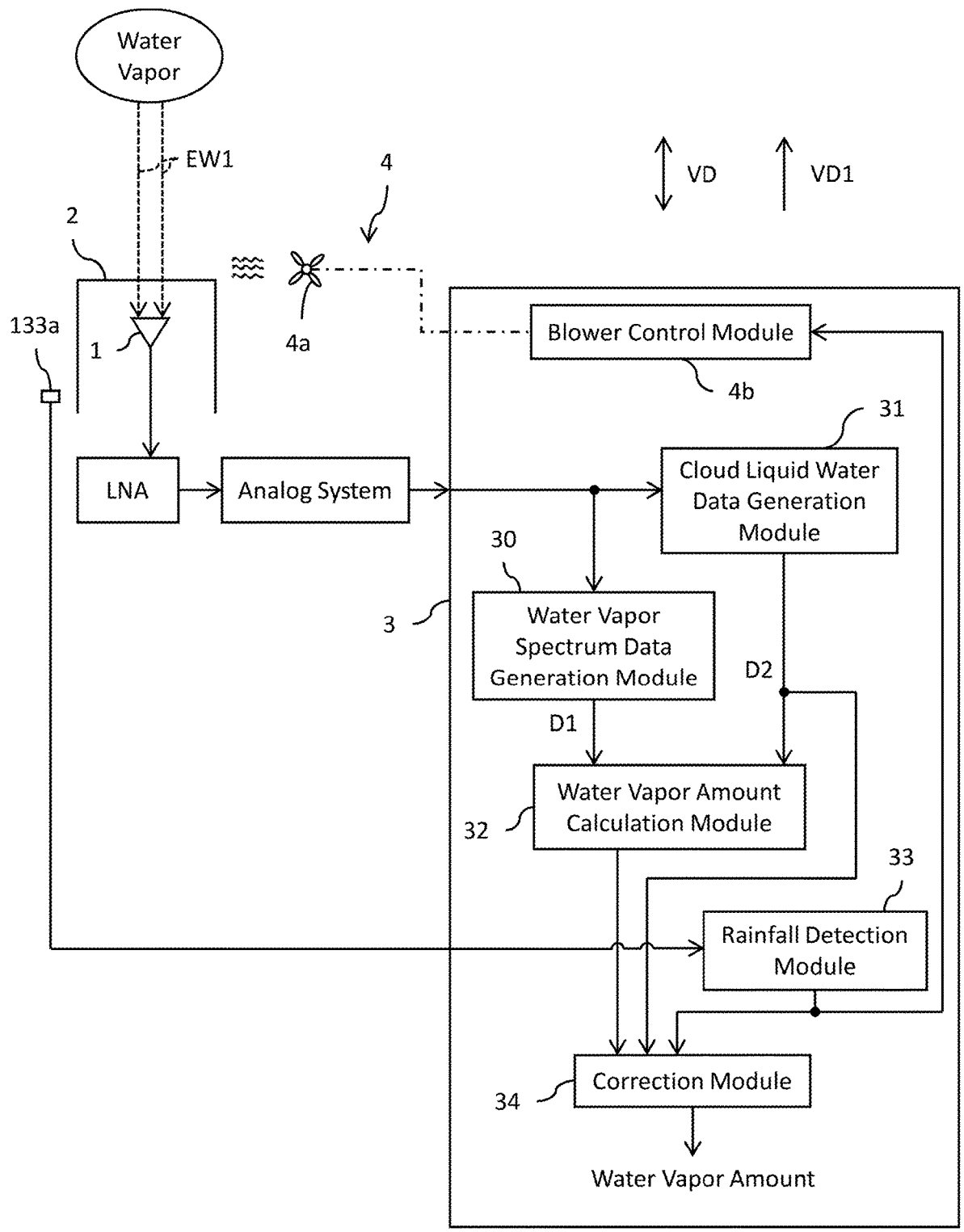
FIG. 7 is a diagram showing a configuration of a microwave radiometer according to yet another embodiment.

As shown in FIG. 7, the rainfall detection module 133 can be a rain sensor 133a disposed near the horn 1. Various types of rain sensors 133a can be employed, such as a capacitive rain gauge, an optical type rain sensor, a comb-type wetness (moisture) sensor, a rain gauge having a capacitance type water level sensor, a snow accretion detection sensor, and a weighing rain gauge.

Figure 8:
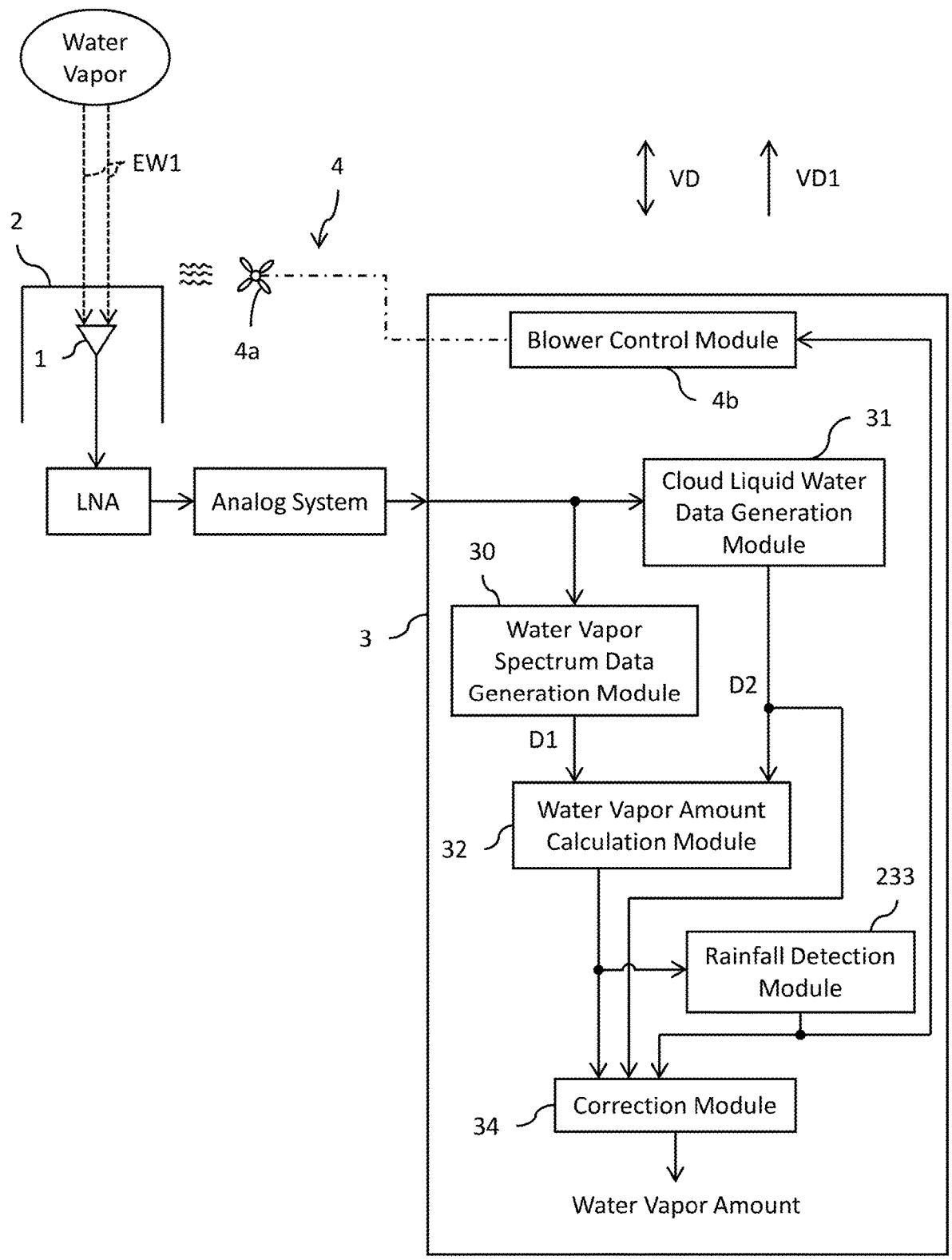
FIG. 8 is a diagram showing a configuration of a microwave radiometer according to yet another embodiment.

As a method for detecting rainfall or snowfall, another modification shown in FIG. 8 can be cited. As shown in FIG. 8, a rainfall detection module 233 detects whether rain or snow is falling based on the temporal change of the water vapor amount calculated by the water vapor amount calculation module 32. Specifically, the rainfall detection module 233 detects whether rain or snow is falling based on the fact that the water vapor amount has decreased or increased at a predetermined gradient or more. As shown in FIG. 4, it is possible to determine that the period of rainfall or snowfall is from a point in time when the amount of water vapor decreases at a predetermined gradient or more to a point in time when the amount of water vapor increases at a predetermined gradient or more. The correction module 34 corrects the water vapor amount in the period T1 during which it is determined that rain or snow is falling based on cloud liquid water data in the period T1.

As a detection method of rainfall or snowfall, the rainfall detection module 33 shown in FIG. 1 may be configured to determine whether rain or snow is falling based on a temporal change in the amount of cloud liquid water indicated by the cloud liquid water data D2. As an example, the rainfall detection module 33 determines whether rain or snow is falling based on the fact that the amount of cloud liquid water has increased or decreased at a predetermined gradient or more. The correction module 34 corrects the amount of water vapor in the period T1 during which it is determined that rain or snow is falling based on the cloud liquid water data D2 in the period T1. As shown in FIG. 4, a period from a point in time when the amount of cloud liquid water increases at a predetermined gradient or more to a point in time when the amount of cloud liquid water decreases at a predetermined gradient or more may be determined as a period of rain or snow.

As described above, the microwave radiometer according to the present embodiment includes:

the electromagnetic wave transmission surface 2;

the vertically upward horn 1 configured to receive the electromagnetic wave EW1 passing through the electromagnetic wave transmission surface 2;

the water vapor spectrum data generation module 30 configured to generate the water vapor spectrum data D1 relating to water vapor based on the electromagnetic wave EW1 received by the horn 1;

the cloud liquid water data generation module 31 configured to generate the cloud liquid water data D2 relating to cloud liquid water based on the electromagnetic wave EW1 received by the horn 1; and the water vapor amount calculation module 32 configured to calculate the water vapor amount S1 by using the water vapor spectrum data D1 and the cloud liquid water data D2.

A water vapor observation method of the present embodiment includes:

receiving the electromagnetic wave EW1 passing through the electromagnetic wave transmission surface 2 by the vertically upward horn 1;

generating the water vapor spectrum data D1 relating to water vapor based on the electromagnetic wave EW1 received by the horn 1;

generating the cloud liquid water data D2 relating to cloud liquid water based on the electromagnetic wave EW1 received by the horn 1; and calculating the water vapor amount S1 by using the water vapor spectrum data D1 and the cloud liquid water data D2.

Thus, since the horn 1 facing upward in the vertical direction can receive the electromagnetic wave, the total amount of the water vapor present above the horn 1 can be measured, and the water vapor amount can be easily measured, for example, as compared with the case when the electromagnetic waves are received in a direction other than the vertically downward direction with the horn facing sideways. Further, since the water vapor amount is calculated using the cloud liquid water data D2 that affects the water vapor amount, the accuracy of calculating the water vapor amount can be improved. Therefore, it is possible to provide the microwave radiometer and the water vapor observation method capable of accurately and easily observing the water vapor amount in consideration of the influence of cloud liquid water in the atmosphere, water attached to a measuring instrument, or snow.

As in the present embodiment, it is preferable that the cloud liquid water data generation module 31 generates the cloud liquid water data D2 based on radio wave intensity of at least two frequencies (18 GHz, 26 GHz).

The amount and gradient of the cloud liquid water spectrum vary with the amount of cloud liquid water. Therefore, by using the radio wave intensity of at least two frequencies (18 GHz, 26 GHz), the cloud liquid water data D2 considering the gradient of the spectrum can be specified.

As in the present embodiment, the cloud liquid water data generation module 31 specifies the virtual line L in the spectrum diagram of the frequency and the radio wave intensity based on the radio wave intensity of at least two frequencies (18 GHz, 26 GHz). Preferably, the water vapor amount calculation module 32 calculates the water vapor amount based on the radio wave intensity at a predetermined frequency (22 GHz) other than at least two frequencies (18 GHz, 26 GHz) and the virtual line L.

Since the water vapor amount is calculated based on the virtual line L, the accuracy of the water vapor amount can be improved.

The rainfall detection modules 33, 133, and 233 detect rain or snow at a location where the horn 1 is located, as in the present embodiment. It is preferable to have the correction module 34 for correcting the water vapor amount based on the cloud liquid water data D2 when the rainfall detection modules 33, 133, and 233 detect rain or snowfall.

Rainfall or snowfall increases the amount of cloud liquid water and decreases the amount of water vapor. Therefore, when rainfall or snowfall is detected, an appropriate amount of water vapor can be obtained by correcting the amount of water vapor based on cloud liquid water data D2.

As shown in FIG. 7, the rainfall detection module 133 is preferably a rain sensor 133a. According to this configuration, rainfall at the location where the horn 1 is located can be directly detected.

As in the example shown in FIG. 1, the rainfall detection module 33 preferably determines whether rain or snow is falling based on the cloud liquid water data D2. According to this configuration, rain or snow can be detected without using a rain sensor or other equipment.

As in the example of FIG. 1 or FIG. 6, it is preferable that the rainfall detection module 33 determines rainfall or snowfall when the amount of cloud liquid water indicated by the cloud liquid water data D2 is equal to or greater than the predetermined threshold Th1, and the correction module 34 calculates a correction value corresponding to the cloud liquid water data D2 and adds the correction value to the amount of water vapor.

According to this configuration, the amount of water vapor can be corrected by simple determination based on the amount of cloud liquid water.

As shown in the example of FIG. 1, it is preferable that the rainfall detection module 33 determines whether rain or snow falls based on the temporal change of the amount of cloud liquid water indicated by the cloud liquid water data D2.

According to this configuration, the amount of cloud liquid water remarkably increases due to rainfall or snowfall, so that rainfall or snowfall can be determined based on the temporal change of the amount of cloud liquid water, and other equipment can be omitted.

As shown in the example of FIG. 1, it is preferable that the rainfall detection module 33 determines whether rain or snow is falling based on the fact that the amount of cloud liquid water has increased or decreased at a predetermined gradient or more, and the correction module 34 corrects the amount of water vapor in the period T1 during which it is determined that rain or snow is falling based on the cloud liquid water data in the period T1.

With this configuration, rainfall determination can be realized based on the temporal change of cloud liquid water amount, and the water vapor amount can be corrected.

As shown in the example of FIG. 8, it is preferable that the water vapor amount calculation module 32 calculates the water vapor amount at every predetermined time, and the rainfall detection module 233 determines whether rain or snow is falling based on the temporal change of the water vapor amount.

According to this configuration, the amount of water vapor remarkably attenuates due to rainfall or snowfall, so that rainfall or snowfall can be determined based on the temporal change of the amount of water vapor, and other equipment can be omitted.

As shown in the example of FIG. 8, it is preferable that the rainfall detection module 233 determines that rainfall or snow has occurred when the amount of water vapor has attenuated or returned at a predetermined gradient or higher, and the correction module 34 corrects the amount of water vapor during the period T1 during which rainfall or snow has occurred based on the cloud liquid water data D2 during the period T1.

With this configuration, rain determination can be realized based on the amount of water vapor, and the amount of water vapor can be corrected.

As in the present embodiment, it is preferable to have removal modules 4 and 104 for removing water or snow adhered to the horn 1 or the electromagnetic wave transmission surface 2.

According to this configuration, since water or snow adhered to the horn 1 or the electromagnetic wave transmission surface 2 affects the received electromagnetic wave, the water or snow adhered to the horn 1 or the electromagnetic wave transmission surface 2 is removed by the removal modules 4 and 104, thereby improving the accuracy of the water vapor observation.

As in the example of FIG. 1, FIG. 7, or FIG. 8, the removal module 4 preferably removes the water or snow using wind force. The removal module 4 is a preferred embodiment.

In the example of FIG. 6, the removal module 104 preferably removes the water or snow by vibration. A preferred embodiment of the removal module 104 is provided.

As in the present embodiment, the removal modules 4 and 104 preferably remove water or snow when the rainfall detection modules 33, 133, and 233 detect rain or snow.

According to this configuration, it is possible to appropriately remove water or snow that prevents reception of electromagnetic waves, thereby improving the accuracy of calculating the amount of water vapor.

Although the embodiments of the present disclosure have been described above with reference to the drawings, it should be understood that the specific configuration is not limited to these embodiments. The scope of the present disclosure is set forth not only by the description of the embodiments described above, but also by the claims, and further includes all modifications within the meaning and scope of the claims.

The structures employed in the above embodiments may be employed in any other embodiment.

The specific configuration of each part is not limited to the above-described embodiment, and various modifications can be made without departing from the scope of the present disclosure.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:
1. A microwave radiometer comprising:
an electromagnetic wave transmission surface;
a vertically upward horn configured to receive an electromagnetic wave passing through the electromagnetic wave transmission surface; and
processing circuitry configured to:

generate water vapor spectrum data relating to water vapor based on the electromagnetic wave received by the horn, generate cloud liquid water data relating to cloud liquid water based on the electromagnetic wave received by the horn, calculate a water vapor amount by using the water vapor spectrum data and the cloud liquid water data, specify a virtual line in a spectrum diagram of frequency and radio wave intensity based on a radio wave intensity of the electromagnetic wave at at least two frequencies, and calculate the water vapor amount based on the virtual line and a radio wave intensity of the electromagnetic wave at a predetermined frequency other than the at least two frequencies.

2. The microwave radiometer according to claim 1, wherein the processing circuitry is further configured to:
generate the cloud liquid water data based on a radio wave intensity of the electromagnetic wave at at least two frequencies.

3. The microwave radiometer according to claim 1, wherein the processing circuitry is further configured to:
detect whether one of rain and snow is falling at a location where the horn is located, and correct the water vapor amount based on the cloud liquid water data when the processing circuitry detects that one of rain and snow is falling.

4. The microwave radiometer according to claim 3, wherein the processing circuitry is further configured to:
detect whether one of rain and snow is falling via a rain sensor.

5. The microwave radiometer according to claim 3, wherein the processing circuitry is further configured to:
determine whether one of rain and snow is falling based on the cloud liquid water data.

6. The microwave radiometer according to claim 5, wherein the processing circuitry is further configured to:
determine that one of rain and snow is falling when a cloud liquid water amount indicated by the cloud liquid water data is equal to or greater than a predetermined threshold value, and
calculate a correction value corresponding to the cloud liquid water data and add the correction value to the water vapor amount.

7. The microwave radiometer according to claim 5, wherein the processing circuitry is further configured to:
determine whether one of rain and snow is falling based on a temporal change in a cloud liquid water amount indicated by the cloud liquid water data.

8. The microwave radiometer according to claim 7, wherein the processing circuitry is further configured to:
determine whether one of rain and snow is falling based on the cloud liquid water amount being increased or decreased at a predetermined gradient or more, and
correct the water vapor amount in a period during which it is determined that rain or snow is falling based on the cloud liquid water data in the period during which it is determined that rain or snow is falling.

9. The microwave radiometer according to claim 3, wherein the processing circuitry is further configured to:
calculate the water vapor amount at a plurality of predetermined time intervals, and
determine whether one of rain and snow is falling based on a temporal change in the water vapor amount.

10. The microwave radiometer according to claim 9, wherein the processing circuitry is further configured to:

determine whether one of rain and snow is falling based on the cloud liquid water amount being increased or decreased at a predetermined gradient or more; and
correct the water vapor amount in a period during which it is determined that rain or snow is falling based on the cloud liquid water data in the period during which it is determined that rain or snow is falling.

11. The microwave radiometer according to claim 1, further comprising:
a cleaner configured to remove water or snow adhered to one of the horn and the electromagnetic wave transmission surface.

12. The microwave radiometer according to claim 10, further comprising:
the cleaner configured to remove water or snow adhered to one of the horn and the electromagnetic wave transmission surface.

13. The microwave radiometer of claim 11, wherein the cleaner is configured to remove one of the water and snow by wind force.

14. The microwave radiometer of claim 11, wherein the cleaner is configured to remove one of the water and snow by vibration.

15. The microwave radiometer according to claim 11, wherein
the cleaner is configured to remove the water or snow when the processing circuitry detects whether rain or snow is falling and
the processing circuitry is further configured to detect whether one of: rain and snow is falling at the location where the horn is located.

16. The microwave radiometer according to claim 13, wherein
the cleaner is configured to remove the water or snow when the processing circuitry detects whether rain or snow is falling and
the processing circuitry is further configured to detect whether one of: rain and snow is falling at the location where the horn is located.

17. A water vapor observation method comprising:
receiving an electromagnetic wave passing through an electromagnetic wave transmission surface of a vertically upward horn;
generating water vapor spectrum data relating to water vapor based on the electromagnetic wave received by the horn;
generating cloud liquid water data relating to cloud liquid water based on the electromagnetic wave received by the horn;
calculating a water vapor amount by using the water vapor spectrum data and the cloud liquid water data;
specifying a virtual line in a spectrum diagram of frequency and radio wave intensity based on a radio wave intensity of the electromagnetic wave at at least two frequencies; and
calculating the water vapor amount based on the virtual line and a radio wave intensity of the electromagnetic wave at a predetermined frequency other than the at least two frequencies.

18. The method according to claim 17, further comprising:
generating the cloud liquid water data based on a radio wave intensity of the electromagnetic wave at at least two frequencies.

19. The method according to claim 17, further comprising:

detecting whether one of rain and snow is falling at a location where the horn is located, and correcting the water vapor amount based on the cloud liquid water data when it is detected that one of rain and snow is falling.

20. The method according to claim 19, further comprising:
   detecting whether one of rain and snow is falling via a rain sensor.

* * * * *